United States Patent [19]

McDonald et al.

[11] 4,401,203

[45] Aug. 30, 1983

[54] PARTS FEEDING BOWL WITH ORIENTING MEANS

[76] Inventors: Walter McDonald, 558 Dell Rd., Landing, N.J. 07850; Norbert F. Seitel, 45 Gillette Rd., Gillette, N.J. 07933

[21] Appl. No.: 313,574

[22] Filed: Oct. 21, 1981

[51] Int. Cl.³ ............................................. B65G 29/00
[52] U.S. Cl. ...................................... 198/392; 198/396
[58] Field of Search ............... 198/396, 389, 443, 392, 198/391, 380; 209/666; 221/157, 160, 163, 164, 165, 167

[56] References Cited

U.S. PATENT DOCUMENTS

| | | | |
|---|---|---|---|
| 3,578,142 | 5/1971 | Burgess, Jr. | 198/389 |
| 3,826,405 | 7/1974 | Hoppman et al. | 198/392 X |
| 3,900,107 | 8/1975 | Hoppmann | 198/392 X |
| 4,138,009 | 2/1979 | Strong | 198/396 |
| 4,279,336 | 7/1981 | Henderson et al. | 198/443 |

FOREIGN PATENT DOCUMENTS 1118952 7/1968 United Kingdom ................. 198/389

Primary Examiner—Joseph E. Valenza
Assistant Examiner—Dennis J. Williamson
Attorney, Agent, or Firm—Weingram & Klauber

[57] ABSTRACT

Apparatus is disclosed for accepting an initially presented population of randomly oriented elongated slender articles which terminate in an enlarged head portion, and providing a high-speed output stream, wherein all said articles are commonly oriented for further mechanical manipulation. The apparatus comprises an input bowl for accepting the articles, which bowl includes a rotatable central disk for feeding objects incident thereupon to the periphery of the disk. A continuous wall member extends upwardly from the disk periphery about a major arced zone, the bottom of the wall member being spaced from the disk to define a gap through which the elongated portion of the articles may protrude while the heads of same continue to ride upon the disk periphery in sliding contact with the side wall. An output section defined adjacent the periphery of the disk at the portion opposed to the arced zone receives and delivers the articles from the disk. A continuous conveying band extends about the periphery of the disk and moves with the articles in the direction of disk rotation at the arced zone. The band separates from the disk peripheral edge beyond the arced zone and extends into the output section. Means cooperate with the band at the output section to constrain the articles between the band and constraining means, whereby the articles are conveyed into the output section. The band diverges from the cooperating means at the end of the output section to release the constrained articles for further mechanical manipulation.

16 Claims, 6 Drawing Figures

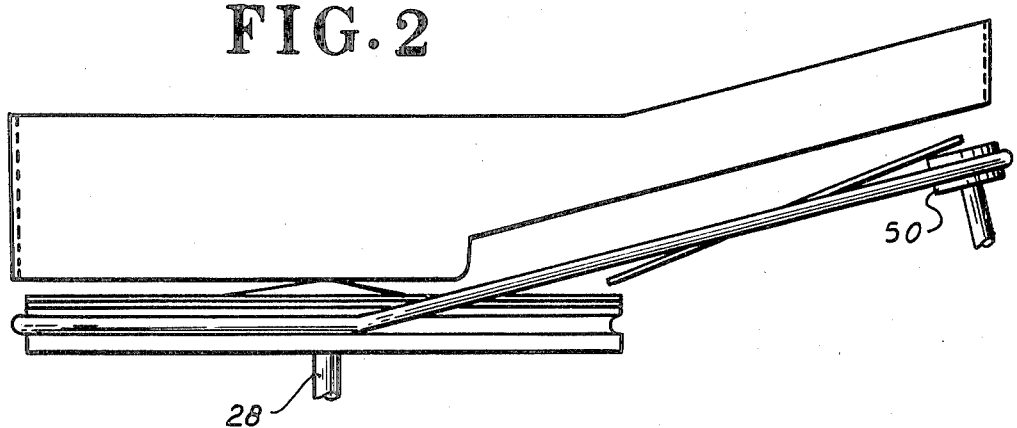
FIG. 2
FIG. 3
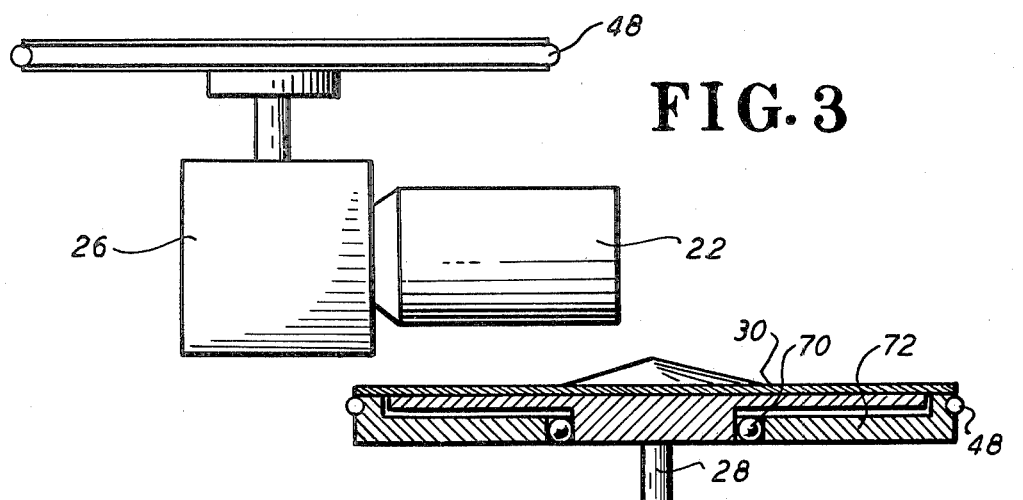
FIG. 4
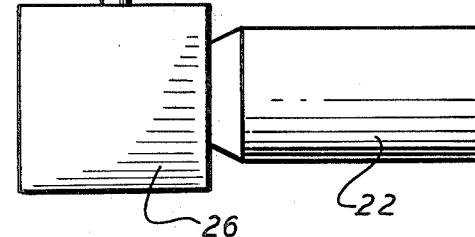
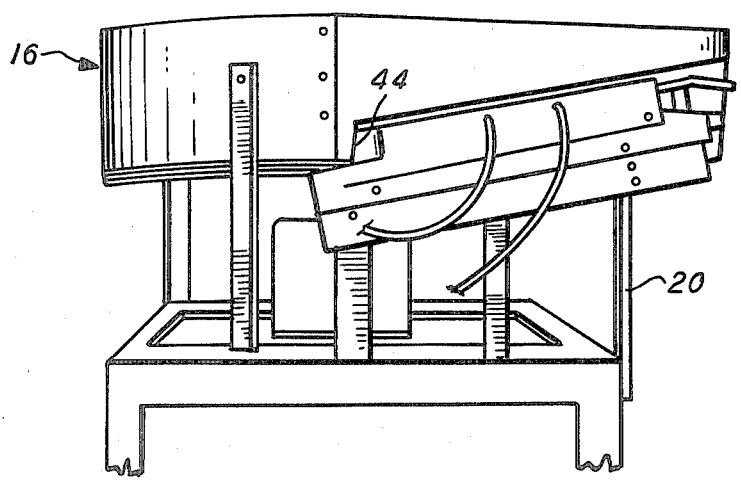
FIG. 5

PARTS FEEDING BOWL WITH ORIENTING MEANS

BACKGROUND OF INVENTION

This invention relates generally to apparatus for accepting an initially presented population of randomly oriented articles and providing a high-speed output stream wherein all the articles are commonly oriented for further mechanical manipulation. The invention is more specifically applicable to apparatus of this type, which are adapted to so treat articles, which are of the type including an elongated slender portion, and an adjoined enlarged head portion.

In numerous applications of processing apparatus, including for use in the packaging industry and the like, it is necessary to orient objects in a common direction and feed same as a high-speed stream for further mechanical manipulation and use. An example of such requirement occurs in connection with the apparatus disclosed in the present inventors' U.S. Pat. No. 4,055,455, which apparatus is useful in lining and testing container closures such as caps or the like. The caps or closures to be thereby processed, must be presented to this apparatus as an incoming stream wherein each cap is oriented with its open end facing in an upward direction; i.e., this is necessary in order that all appropriate functions of the lining and testing apparatus be performed. It will be evident, further, that in numerous other manufacturing operations, parts similarly must be oriented in common directions to enable a continuous stream for processing of same.

Pursuant to the foregoing, various apparatus for orienting and feeding small parts, such as caps, lids, or the like, have been developed over the years. The present inventors' U.S. Pat. No. 4,214,656 for example, is specifically directed at the cap orienting and feeding problem which has been described. In this patent, a construction is thus disclosed which enables increased dependability in cap orientation and also higher speed and feeding of same. These objectives are achieved by an arrangement which includes a feeder bowl which accepts the randomly oriented caps and feeds same from an output port thereof, as an in-line stream of caps oriented in a substantially horizontal plane. An inclined twisting chute extends from the output of the feeder bowl. This chute receives the in-line stream of caps and twists the plane of advance through 90°, whereby the caps are reoriented to a stream wherein the diameters are substantially in a vertical plane. A guide chute extends at an incline from the twisting chute and includes an input section for receiving the caps at the vertical orientation, an output section whereat the caps are oriented with their diameters parallel to the support surface, and a transition zone between the input and output sections, whereat the caps gravitationally tip and fall from the vertical plane to the reoriented, more nearly horizontal positions. A biasing device can be used in conjunction with this arrangement for biasing the tipping of the caps so that they fall with the open ends thereof, facing in upward direction. This can include a knife edge along which the caps roll on their side edges and means to encourage the desired tipping, such as lateral air jets.

Provided that the objects to be treated resemble a simple cylinder, apparatus of the aforementioned type is very effective in achieving the desired orientation and feed. However, there are numerous parts, including in instances, cap lids and the like, which take the form of an article including an elonged slender portion terminating in an enlarged head portion. For example, many cap closures commonly in use in the dispensing industry, include an elongated nozzle which extends from an enlarged base portion. Such base may have internal threads for securing to a container. Clearly, this type of closure cannot be effectively handled by the apparatus of our said U.S. Pat. No. 4,214,656. It will also be clear that numerous articles (other than cap closures) have the type of shape mentioned.

In accordance with the foregoing, it may be regarded as an object of the present invention, to provide apparatus capable of orienting, ordering, and rapidly feeding a population of randomly arranged objects of the type which include an elongated slender portion, which is adjoined to an enlarged base portion, to yield an output stream wherein all such objects are uniformly oriented, thereby facilitating further manipulation and/or processing of the said objects.

It is a further object of the present invention to provide apparatus of the foregoing character, which is capable of feed rates for the said objects which have heretofore been unattainable in prior art apparatus, which apparatus further, acheives unusually high dependability, as measured by the deviation in numbers of articles from the desired orientation at the output of the said apparatus.

SUMMARY OF INVENTION

Now in accordance with the present invention, apparatus is disclosed for accepting an initially presented population of randomly oriented elongated slender articles which terminate in an enlarged head portion, and providing a high-speed output stream, wherein all said articles are commonly oriented for further mechanical manipulation.

The apparatus of the invention comprises an input bowl for accepting the articles, which bowl includes a rotatable central disk for feeding objects rendered incident thereupon to the periphery of the disk. A continuous wall member extends upwardly from the disk periphery about a major arced zone, the bottom of the wall member being spaced from the disk to define a gap through which the elongated portion of the articles may protrude while the heads of same continue to ride upon the disk periphery in sliding contact with the side wall. An output section defined adjacent the periphery of the disk at the portion opposed to the arced zone, receives and delivers the articles from the disk.

A continuous conveying band extends about the periphery of the disk and moves with the articles in the direction of disk rotation at the arced zone. The band separates from the disk peripheral edge beyond the arced zone and extends into the output section. Means cooperate with the band at the output section to constrain the articles between the band and constraining means, whereby the articles are conveyed into the output section. The band diverges from the cooperating means at the end of the output section to release the constrained articles for discharge and further mechanical manipulation.

A platform is adjoined to the periphery of the disk at the output section and extends into the output section. The platform extends upwardly at an angle from the plane of the disk, and the apparatus further includes means to displace articles improperly conveyed by the said band and cooperating constraining means, to the inclined platform, whereupon the articles are gravitationly returned back to the adjoining disk for further orientation and feeding. The means to so displace the articles may comprise air jets and/or mechanical displacing means which act against the constrained articles while same are being conveyed, whereby articles improperly seated are displaced by said means.

The constraining means cooperating with the band may comprise a dead plate spaced from the band by approximately the spacing of the elongated, narrow portion of the articles, whereby the articles may be carried by the band with their narrow portions constrained between the band and dead plate, in sliding contact with the latter, and with the enlarged head portion protruding beyond the band and plate.

The means cooperating with the conveying band to constrain the articles, can further comprise a second carrier band and means to move said second band in the direction of the first band with the constrained article being carried by the movement of both said bands. The first and second bands can be driven at a common speed. It is also possible to drive the first and second bands at differing speeds, using a common driving source through separate power trains, or using two driving sources. This last feature can be useful for encouraging orientation of certain types of objects.

The apparatus of the invention can also be utilized for orienting and feeding cylindrical objects of uniform diameters, when the gap between wall and rotating disk is less than the diameters of the objects. In such instance, the gap serves to discharge debris and "short-shot" moldings from the rotating disk. Again, however, objects not constrained by the conveying band and cooperating constraining means, are displaced back to the disk for refeeding.

BRIEF DESCRIPTION OF DRAWINGS

The invention is diagrammatically illustrated, by way of example, in the drawings appended hereto, in which:

FIG. 2 is a side elevational view of the input bowl and central disk portion of the FIG. 1 apparatus, and illustrates arrangement of certain of the conveying belt elements present in the device;

FIG. 3 is a somewhat schematic side elevational view of the central disk portion of the FIG. 1, apparatus and illustrates one arrangement for driving the said disk;

FIG. 4 is a transverse cross-sectional view through the disk of FIG. 2, and illustrates (partially in schematic fashion) a further mode for driving the disk;

FIG. 5 is an external side elevational view of the apparatus of FIG. 1; and

DESCRIPTION OF PREFERRED EMBODIMENT

Figure 1:
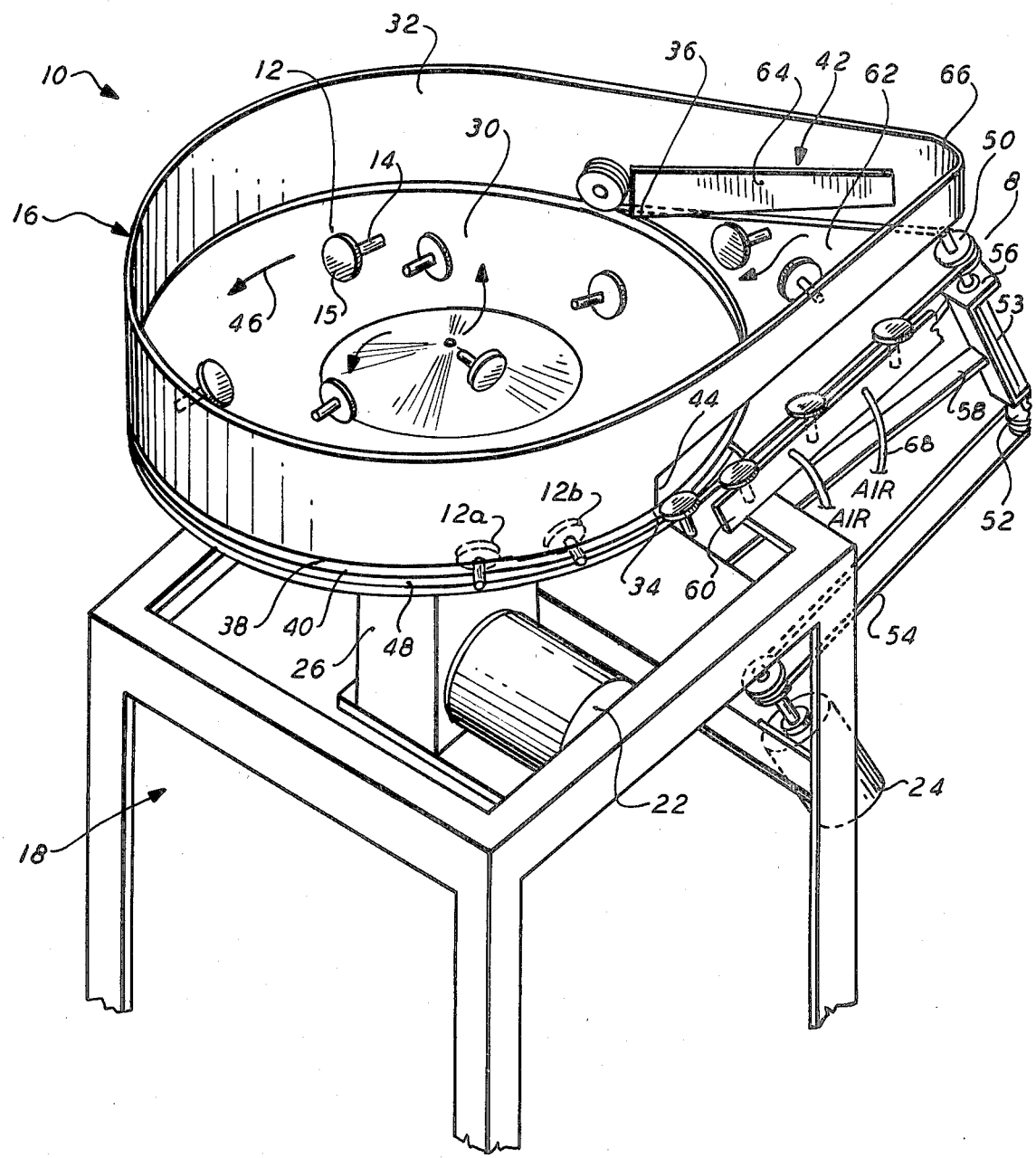
FIG. 1 is a perspective view of a parts feeding apparatus in accordance with the present invention.

Apparatus 10 in FIG. 1 will be described especially for use in connection with orientation and feeding of articles, parts, or components 12, of the type seen in that and in the remaining Figures, such as e.g. FIG. 6. These components 12 are characteristic of the type of articles with which the present apparatus is intended to be utilized. The articles 12, as thus seem to include an elongated slender central portion 14, which terminates in an enlarged head portion 16. There is no intention to in any way be limited with respect to use of the apparatus with particular types of such articles 12; but for purpose of illustration, it can be pointed out that in many typical applications, article 12 can comprise a closure or container cap, in which instance the portion 12 is actually a cylinder, open at one end and provided with internal threads, with a central nozzle (corresponding to 14) extending from the center of the closed end. This last type of closure is commonly used for dispensing containers and the like, with the nozzle being provided with an opening, or being hollow and openable by cutting off the tip prior to use of the dispensing container.

It is reiterated, however, that numerous other articles have similar shape characteristics, and thus for purposes of FIG. 1, it primarily is to be considered that a collection of randomly arranged such articles are intended for initial feed to the input bowl generally designated at 16, with the objective being to provide an output feed at 8 (see especially FIG. 6), wherein the discharged articles are oriented in a common direction—in this instance with the slender elongated portion facing downward, and the head facing in an upward direction. Thus, in those instances where the articles 12 are container caps, this orientation permits rapid feed of the objections to further processing machinery, as for example, the cap lining and testing apparatus which heretofore has been described.

Apparatus 10 is seen to include a support base 18 from which the feed bowl 16 is supported by a plurality of uprights 20 which extend from the base (FIG. 5). The said base 18 also supports electric drive motors 22 and 24, and a reducer 26 which is provided in the power train between motor 22 and the drive shaft 28 for a central disk 30 which defines the bottom receiving surface of feeder bowl 16.

A continuous wall member 32, formed of sheet metal or the like, extends upwardly from above the periphery of disk 30 and extends about a major arc of the disk. In particular, as seen in FIG. 1, the said member 32 extends upwardly from approximately points 34 to 36 about the intervening major arc of the said disk. As may be seen from FIGS. 1 and 2 the bottom 38 of the said wall member, is slightly spaced from the disk periphery, to thereby define a gap 40. During use of apparatus 16, the articles 12 to be oriented are deposited en mass upon the upwardly facing surface of disk 30, which is rotating in direction 46 at a relatively rapid speed, in consequence of being driven by motor 22 through reducer 26. Centrifugal forces acting upon the individual articles 12 drive same outwardly, and the continued rotation of the disk causes the elongated slender portions 14 of the articles 12 to protrude through gap 40. Upon this happening the said articles continue to ride upon the disk periphery about the bowl, with the downwardly facing surface of head portions 16 riding in sliding contact with sidewall 32. This type of action can be seen with the articles 12a and 12b in FIG. 1.

Toward the right side of FIG. 1 an output section 42 is defined for apparatus 10. This output section 42 is adjacent the periphery of disk 30 at the portion thereof which is opposed to the arced zone, i.e. the output section 42 adjoins the minor arc between 34 and 36 on the disk. At this portion of the feed bowl, the wall 32 is cut upwardly as at 44, so that articles such as 12a and 12b which advance about the disk in the direction of rotation 46, can exit the bowl, i.e. can depart from the disk at approximately point 44.

In accordance with a major aspect of the present invention, it is seen that a continuous conveying belt or band 48 extends about the peripheral edge of disk 30, departing from such periphery at about the points 34 to 36, and extending from such points into the output zone 42 of the apparatus. At the far end of such output zone, the band 48 passes about a roller 50, which in the embodiment of the apparatus shown in FIG. 1, is driven by a roller 52, in turn driven by motor 24 through the drive belt 54. The rollers 50 and 52 are carried on an axle 53 which is journaled for rotation in a support frame 56, in turn secured via member 58 to the frame 18.

The articles that exit from the bowl 16 are specifically conveyed therefrom by being constrained in firm fashion between the conveying band 48 and a dead plate 60 which is spaced from band 38 by approximately the distance appropriate to constrain the reduced portion 14 of the articles 12. The band 48 is preferably formed of a flexible elastomeric material which has reasonbly good frictional properties, such as a vinyl-type plastic; or of other elastomeric materials including natural and artificial rubbers. Thus good contact and engagement with the said articles 12 is enabled, and the said articles are readily conveyed in sliding contact with the dead plate 60, and then discharged in oriented fashion at the far output end 18 of the apparatus.

It is further seen in FIGS. 1, 2, and 5 that a smooth surfaced platform 62 is adjoined to the periphery of disk 30 at the output section 42, and extends into the output section indeed constituting the underlying portion of same. This platform 42, as may be seen especially in FIGS. 2 and 4, extends upwardly at a angle from the generally horizontal plane of the disk. A guide plate 64 is present at the side of platform 62 opposed to that bordering whrere the articles exit. It will also be clear that the extended end 66 of wall 32 is approximately contiguous to surface 62; and thus it will be clear that articles 12 that become deposited upon that the surface of platform 66 will be confined and tend to slide back to the central disk 30.

More specifically, it is seen that a plurality of air jets 68 are provided to one side of dead plate 60. The object of these air jets, the outputs of which are generally directed across the line of advance of the articles 12, is to provide a force against same tending to displace improperly oriented articles which are being conveyed between the dead plate 60 and band 48, so that such improperly oriented articles are forced from the zone of conveyance defined between plate 60 and the band 48 onto plate 62, where they are gravitationally returned to disk 30 for refeeding and reorientation. In consequence, a relatively high speed output of highly oriented articles is fed through the zone of conveyence, to be discharged as shown, e.g. in FIG. 6.

It will also be evident that other displacing means such as electromechanically activated pushers can perform the function of air jets 68—i.e., in displacing articles onto surface 62 which are not properly constrained between dead plate 60 and band 48.

In the embodiment of the invention shown in FIGS. 1 2, and 4, it is seen that conveying band 48 is actually driven by motor 24, i.e., via the roller 50. Referring to FIG. 4, it is seen conversely that disk 30 is independently driven by motor 22 and reducer 26, with the disk being independently rotatable from band 48 by virtue of the journaling provided by ball bearings 70, which permit a belt drive pully 72 to rotate independently of the disk 30.

It is further within the province of the invention, however, as shown especially in FIG. 3, for the belt 48 to be directly driven by the disk 30; i.e., in the arrangement of FIG. 3, there is no separate belt drive pully; rather the belt 48 is in direct contact with and driven by the disk 30 proper, which is driven by motor 22 through the reducer 26.

Figure 6:
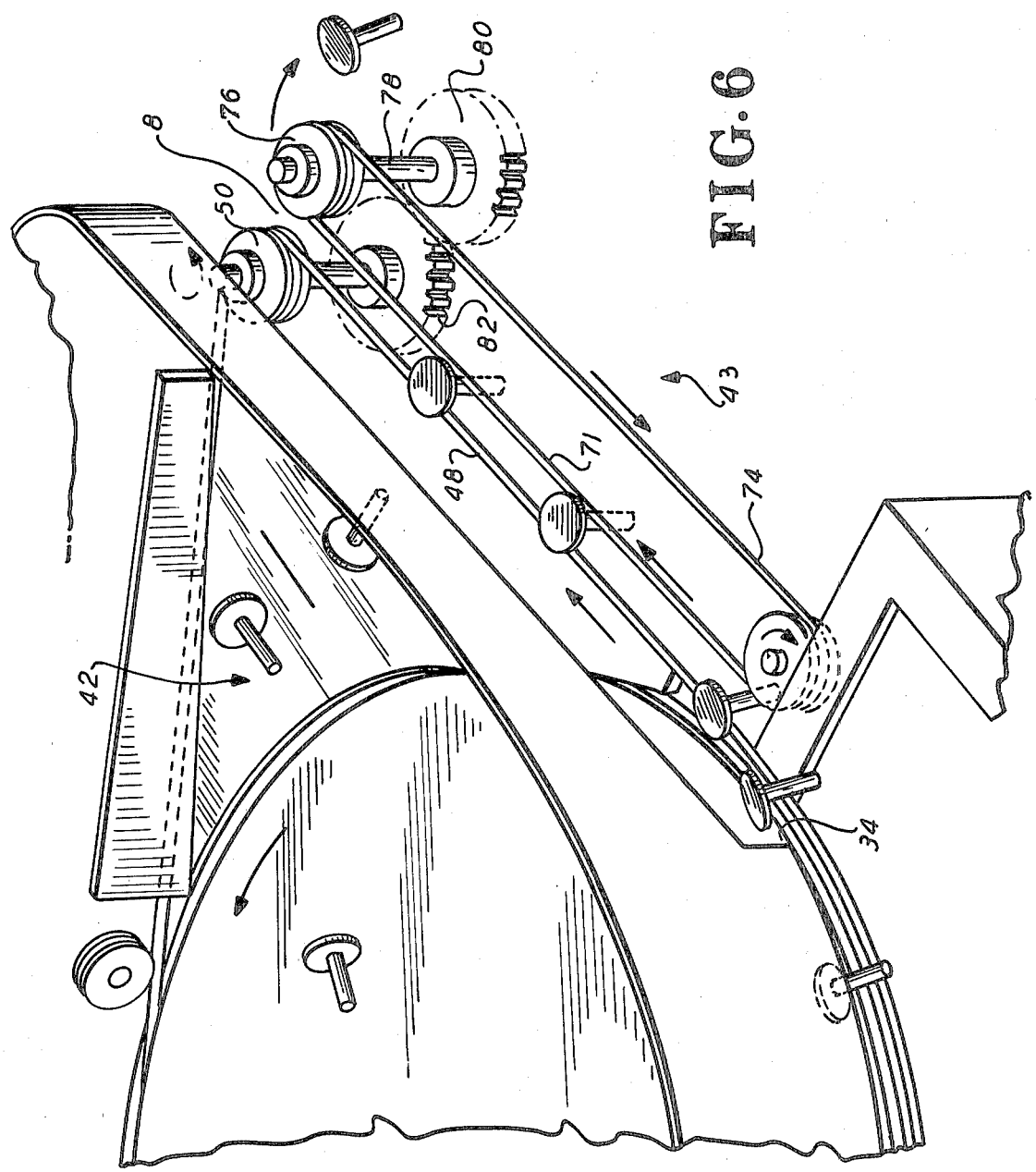
FIG. 6 is a perspective view of the output portions of apparatus generally similarly to that of FIG. 1, but illustrating a further embodiment of the invention with respect to the conveying arrangement for parts leaving the feed bowl for discharge.

In FIG. 6, a further embodiment of the apparatus of the present invention appears. Except for the arrangement utilized at the output end 42 of the apparatus, and more specifically, the arrangement used in the conveyence zone 43 which extends from point 34 on the disk periphery to the discharge zone 8, the elements of the apparatus in FIGS. 6 are identical to those previously described e.g., in connection with FIG. 1. The zone of conveyance 43 can alternatively be regarded as being the space between band 48 and the portion 71 of belt 43 which is parallel to and moves in the same direction as band 48.

In the instance of the embodiment of FIG. 6, however, it is seen that dead plate 60 of FIG. 1, has been replaced by a second conveying belt or band 74. This band 74 is comprised of the same material as 4 described in connection with band 48. The band 74 is driven by a roller 76, which in turn, is carried by a drive axle 78, extending to a drive gear 80. Gear 80, in turn, is seen to be driven by gear 82, which is journaled commonly with the drive roller 50, which as described in connection with FIG. 1, controls the speed of advance of band 48.

Clearly, where a 1:1 ratio exists between gears 80 and 82, the speed of advance of each of the bands 48 and 74 can be common. In some instances, however, it has been found desirable to utilize different gear ratios, or to otherwise adjust the speed of advance of band 74 with respect to that of band 48, so that they advance at differing rates. The objective of such an arrangement is to achieve reorientation of certain types of objects being conveyed by the present device through zone 43. It will be clear further, that the gearing arrangement discussed can be utilized regardless of whether the band 48 is driven through motor 22 as in FIG. 3, or whether it is instead driven through motor 24, as would be the case where the arrangement of FIG. 4 were utilized for driving disk 30.

While the present invention has been particularly described in terms of specific embodiments thereof, it will be understood in view of the present disclosure, that numerous variations upon the invention are now enabled to those skilled in the art, which variations yet reside within the scope of the present teaching.

Thus for example, while the apparatus of the invention has been particularly described for use in connection with orienting and feeding objects characterized by an elongated narrow portion adjoined to an enlarged base portion, the apparatus can serve to orient and feed commonly sized elongated cylindrical objects of uniform diameter. Thus, if the gap between wall number 32 and disk 30 is less than the diameters of such objects, the gap serves only the function of permitting discharge of debris and so-called "short shots" molded objects. The remaining cylinders, however, (e.g. lipstick cases) proceed to the disk periphery where their axes become approximately tangential to the periphery of the disk, and are then received and constrained between the output conveying belt and dead plate (or between the two belts as in FIG. 6).

Again, improperly constrained such articles (e.g. those riding only partly held by the conveying and cooperating means) are displaced by the air jets or equivalents, back to surface 62 for reorientation and feeding.

Accordingly, the invention is to be broadly construed, and limited only by the scope and spirit of the claims now apended hereto.

We claim:

1. Apparatus for accepting an initially presented population of random articles of the type including an elongated narrow portion adjoined to an enlarged base portion, and providing a high speed output stream, wherein all said articles are commonly oriented for further mechanical manipulation; said apparatus comprising:

an input bowl for accepting said articles, said bowl including a rotatable central disk for feeding said articles rendered incident thereupon to the periphery of said disk;

a continuous wall member rising upwardly from a point adjacent the periphery of said disk and extending about a major arced zone of said disk; the bottom of said wall member being spaced from the disk periphery to define a gap through which the elongated portions of said articles may protrude while the bases of same continue to ride said disk periphery in sliding contact with the inner surface of said side wall;

an output section for receiving and delivering said articles from said disk, being defined at said apparatus adjacent the periphery of said disk, at the portion thereof opposed to said major arced zone;

a continuous conveying band extending about the periphery of said disk, said band and said articles moving in the direction of disk rotation at said arced zone;

said band separating from said disk periphery beyond said major arced zone and extending into said output section;

said wall member having an opening at said output section where said band separates from said disk, for permitting said articles to leave said disk and said bowl with said band;

means cooperating with said band at said output section to constrain said articles between said band and said means, whereby said articles are carried into said output section; and said band diverging from said cooperating means at the end of said output section to release said constrained articles for said further mechanical manipulation.

2. Apparatus in accordance with claim 1, further including a platform adjoined to the periphery of said disk at said output section and extending into said output section, said platform extending upwardly at an angle from the plane of said disk; and said apparatus further including means to displace articles improperly conveyed by said band and cooperating constraining means to said inclined platform, whereby said articles are gravitationly returned back to the adjoining said disk for further orientation and feeding.

3. Apparatus in accordance with claim 2, wherein said means to displace said articles comprise air jet means for directing air jets against said constrained articles while same are being conveyed, whereby articles improperly seated are displaced by said jets.

4. Apparatus in accordance with claim 2, wherein said constraining means cooperating with said band comprises a dead plate spaced from said band by approximately the spacing of the elongated, narrow portion of said articles, whereby said articles may be carried by said band with said narrow portion constrained between the band and dead plate in sliding contact with the latter, and with the said base portion protruding beyond the sandwiched band and plate.

5. Apparatus in accordance with claim 2, wherein said means cooperating with said band to constrain said article, comprises a second carrier band, and means to move said second band in the direction of the said first band with the constrained article being carried by the movement of both said bands.

6. Apparatus in accordance with claim 5, wherein said first and second bands are commonly driven.

7. Apparatus in accordance with claim 5, wherein said first and second bands are driven at a common speed.

8. Apparatus in accordance with claim 5, wherein said first and second bands are driven at differing speeds.

9. Apparatus for accepting an initially presented population of cylindrical commonly sized articles, and providing a high speed output stream, for further mechanical manipulation; said apparatus comprising:

an input bowl for accepting said articles, said bowl including a rotatable central disk for feeding said articles rendered incident thereupon to the periphery of said disk;

a continuous wall member rising upwardly from a point adjacent the periphery of said disk and extendng about a major arched zone of said disk; the bottom of said wall member being spaced from the disk periphery to define a gap through which undersized articles or debris may exit while the remaining said articles continue to ride said disk periphery in sliding contact with the inner surface of said side wall;

an output section for receiving and delivering said articles from said disk, being defined at said apparatus adjacent the periphery of said disk, at the portion thereof opposed to said major arced zone;

a continuous conveying band extending about the periphery of said disk, said band and said articles moving in the direction of disk rotation at said arced zone;

said band separating from said disk periphery beyond said major arced zone and extending into said output section;

said wall member having an opening at said output section where said band separates from said disk, for permitting said articles to leave said disk and said bowl with said band;

means cooperating with said band at said output section to constrain said articles between said band and said means, whereby said articles are carried into said output section; and said band diverging from said cooperating means at the end of said output section to release said constrained articles for said further mechanical manipulation.

10. Apparatus in accordance with claim 9, further including a platform adjoined to the periphery of said disk at said output section and extending into said output section, said platform extending upwardly at an angle from the plane of said disk; and said apparatus further including means to displace articles improperly conveyed by said band and cooperating constraining means to said inclined platform, whereby said articles are gravitationly returned back to the adjoining said disk for further orientation and feeding.

11. Apparatus in accordance with claim 10, wherein said means to displace said articles comprise air jet means for directing air jets against said articles while same are being conveyed, whereby articles improperly seated are displaced by said jets.

12. Apparatus in accordance with claim 10, wherein said constraining means cooperating with said band comprises a dead plate spaced from said band by approximately the diameter of said articles, whereby said articles may be carried by said band sandwiched between the band and dead plate in sliding contact with the latter.

13. Apparatus in accordance with claim 10, wherein said means cooperating with said band to constrain said article, comprises a second carrier band, and means to move said second band in the direction of the said first band with the article being carried by the movement of both said bands.

14. Apparatus in accordance with claim 13, wherein said first and second bands are commonly driven.

15. Apparatus in accordance with claim 13, wherein said first and second bands are driven at a common speed.

16. Apparatus in accordance with claim 13, wherein said first and second bands are driven at differing speeds.

* * * * *